(12) United States Patent
Archambault

(10) Patent No.: US 10,843,879 B2
(45) Date of Patent: Nov. 24, 2020

(54) LOAD STATION FOR A PNEUMATIC TRANSFER SYSTEM AND METHODS OF USE THEREOF

(71) Applicant: TRANS-VAC SYSTEMS LLC, Denver, CO (US)

(72) Inventor: George Archambault, Lakewood, CO (US)

(73) Assignee: TRANS-VAC SYSTEMS LLC, Denver, CO (US)

( * ) Notice: Subject to any disclaimer, the term of this patent is extended or adjusted under 35 U.S.C. 154(b) by 0 days.

(21) Appl. No.: 16/365,137

(22) Filed: Mar. 26, 2019

(65) Prior Publication Data

US 2019/0291974 A1 Sep. 26, 2019

Related U.S. Application Data

(60) Provisional application No. 62/648,177, filed on Mar. 26, 2018.

(51) Int. Cl.
*B65G 51/28* (2006.01)

(52) U.S. Cl.
CPC .................. *B65G 51/28* (2013.01)

(58) Field of Classification Search
None
See application file for complete search history.

(56) References Cited

U.S. PATENT DOCUMENTS

| | | | |
|---|---|---|---|
| 2,199,894 A | 5/1940 | Phelps | |
| 3,449,789 A | 6/1969 | Russell et al. | |
| 3,807,807 A | 4/1974 | Boon | |
| 3,985,316 A | 10/1976 | Weissmuller | |
| 4,076,321 A * | 2/1978 | Haight | B65G 51/02 406/117 |
| 4,658,732 A * | 4/1987 | Coester | B61C 11/06 104/156 |
| 4,831,777 A | 5/1989 | Johnson, Jr. | |
| 4,849,999 A | 7/1989 | Humphreys et al. | |
| 5,127,773 A | 7/1992 | Foreman et al. | |
| 5,410,149 A | 4/1995 | Winston, Jr. et al. | |
| 5,421,626 A | 6/1995 | Glachet | |
| 5,551,576 A | 9/1996 | Importico | |
| 5,592,780 A | 1/1997 | Checkovich | |
| 5,636,710 A | 6/1997 | Ables et al. | |
| 5,996,281 A | 12/1999 | Takano et al. | |

(Continued)

FOREIGN PATENT DOCUMENTS

WO WO 2009/150982 12/2009

OTHER PUBLICATIONS

Invitation to Pay Additional Fees for International (PCT) Patent Application No. PCT/US/2019/024061, dated May 31, 2019, 2 pages.

(Continued)

*Primary Examiner* — William R Harp
(74) *Attorney, Agent, or Firm* — Sheridan Ross P.C.

(57) ABSTRACT

A system and method for a loading station of a pneumatic transfer system is provided. The system and methods comprise structure and functionality to allow for loading of contents and materials to be provided into a loading station or entry point of a system. The system and methods further comprise structure and functionality to limit the risk of overloading a particular input point and ergonomic features to enhance a user experience.

18 Claims, 7 Drawing Sheets

(56) References Cited

U.S. PATENT DOCUMENTS

| | | |
|---|---|---|
| 6,962,239 B2 | 11/2005 | Shikai et al. |
| 7,264,421 B2 | 9/2007 | Brown |
| 7,309,192 B1 | 12/2007 | Gromley et al. |
| 8,366,353 B2 | 2/2013 | Scott |
| 9,292,823 B2 * | 3/2016 | Hoganson .............. B65G 51/44 |
| 9,725,253 B2 | 8/2017 | Embley et al. |
| 2016/0097206 A1 | 4/2016 | Embley |

OTHER PUBLICATIONS

International Search Report and Written Opinion for International (PCT) Patent Application No. PCT/US2019/24061, dated Jul. 17, 2019, 10 pages.

\* cited by examiner

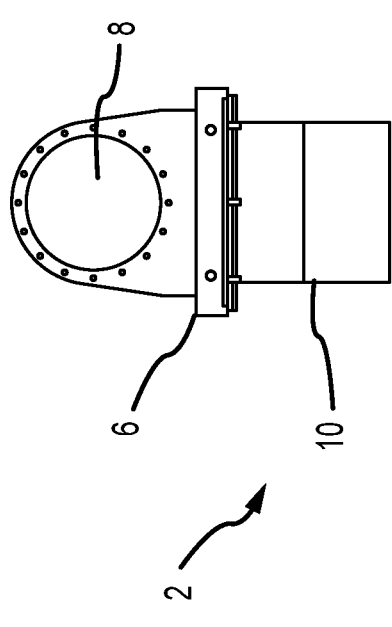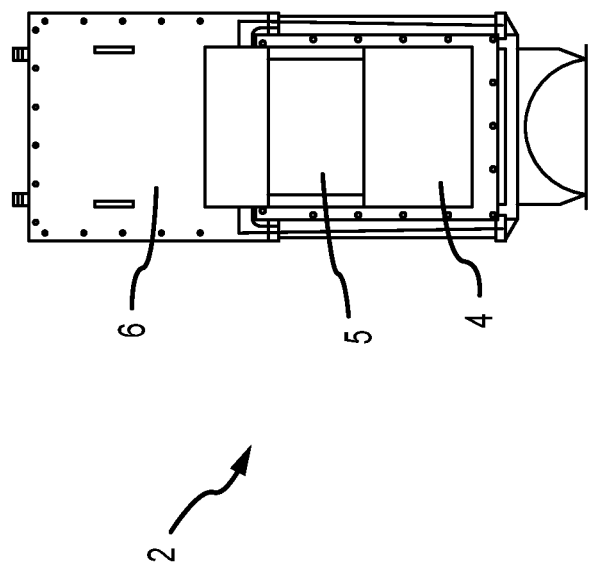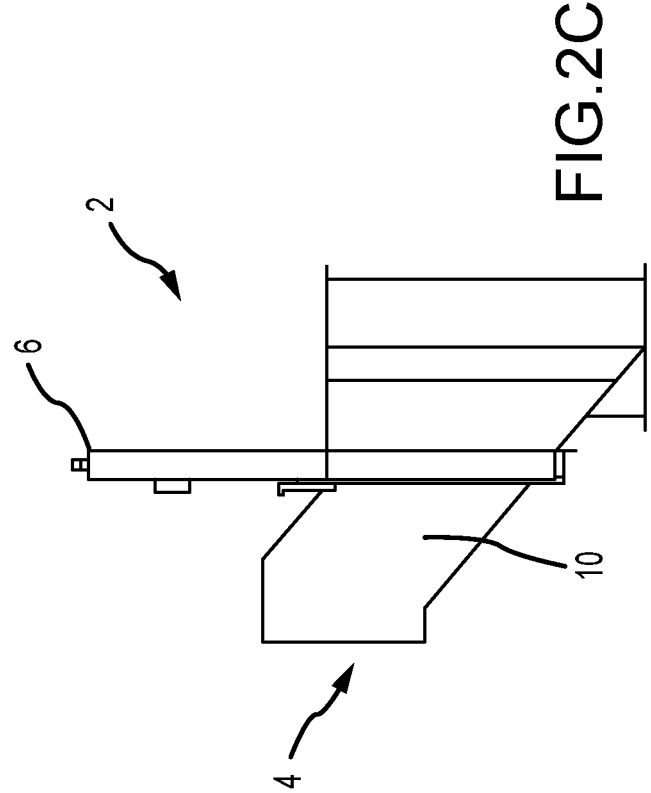

LOAD STATION FOR A PNEUMATIC TRANSFER SYSTEM AND METHODS OF USE THEREOF

This U.S. Non-Provisional Patent Applications claims the benefit of priority from U.S. Provisional Patent Application Ser. No. 62/648,177, filed Mar. 26, 2018, the entire disclosure of which is hereby incorporated by reference.

FIELD

The present disclosure relates generally to pneumatic tube delivery systems. More specifically, the present disclosure relates to systems and devices for loading stations of pneumatic tube delivery systems and methods of operating the same.

BACKGROUND

Pneumatic tube delivery systems are useful for safely and efficiently transporting materials. Such systems are known to be used for transporting materials such as waste, linens, currency, and other objects from point to point. The systems typically convey materials between different locations in a building, a development, or other interconnected space. These systems require at least one entry or load point, typically referred to as a load station. Existing systems fail to adequately address risks associated with clogging an entry point or endpoint of the system. Such clogging or obstruction, which may be the result of providing too many materials to the endpoint in a given time period, can result in down-time for the system and various related complications.

SUMMARY

Accordingly, there has been a long-felt but unmet need to provide a system that limits a user's ability to overload an endpoint. There further exists a need to limit or prevent risk of overloading while maintaining a safe and user-friendly system.

In various embodiments, loading stations for pneumatic transport systems are provided. In some embodiments, the systems comprise a plurality of doors having at least a first or outer door and a second or inner door. A loading area or throat is provided between the first and second door. Contents including but not limited to waste, recycling, and/or linens may be inserted into the throat through the first door. Contents may thereafter enter a transport tube or other internal component of a system through the second door.

In various embodiments of the present disclosure, methods and systems of loading stations and of operating door systems of a loading station are provided. In preferred embodiments, an inner door is caused to partially close to indicate to a user that loading operations should cease.

In one embodiment, a method of operating a loading station of a pneumatic transfer system is provided, the method comprising: activating a system comprising a loading station, opening a first door of the loading station; opening a second door of the loading station; allowing materials to be provided into at least a portion of the loading station; monitoring for a first condition to be satisfied and based on the first condition being satisfied, partially closing the second door; monitoring for a second condition to be satisfied, and based on the second condition being satisfied, completely closing the second door; and closing the first door.

In one embodiment, a method of operating a loading station is provided, the method comprising activating a system comprising at least one loading station, opening an outer door of the loading station, providing contents to a throat area of a loading station while an inner door remains closed. Subsequent to the step of providing contents, a user closes the outer door. The inner door is then opened by the system and contents deposited by a user are drawn into a transport pipe or similar internal component of the system. The inner door subsequently closes automatically, based on information received by at least one of a timer and a sensor provided in the system. The sensor may include, for example, a pressure or weight sensor in the throat area, for example, or a light sensor to detect whether or not contents remain in the throat area of the loading station.

Although various embodiments of the present disclosure contemplate a throat area between first and second doors, methods, systems and devices of the present disclosure are not limited to these structures. For example, it is contemplated that methods and systems of operating one or more doors of the present disclosure as shown and described herein are implemented with other loading stations and loading station structures. Such alternative structures include, but are not limited to those shown and described in U.S. Pat. No. 9,725,253 to Embley, which is hereby incorporated by reference in its entirety.

In another embodiment, a method of operating a loading station is provided. The method comprises the steps of activating a system comprising a loading station, opening an outer door of the loading station, and wherein at least one of the activation of the system and the opening of the outer door causes an inner door to open. With both doors at least partially open, a user loads contents into the station. The inner door is then closed based on information received from a timer, a sensor, and/or a switch. In some embodiments, the closing of the inner door comprises a step of partially closing the inner door to prevent most or all contents from being drawn into internal components of the system. Complete closing of the inner door is not completed until a condition is satisfied. In some embodiments, this condition comprises the condition that the outer door is shut and the system provides a signal to indicate that the outer door has been shut. In such embodiments, a partial closing of the inner door is initiated by at least one of a timer, a closing of the outer door and a signal indicating the same, a manual trigger or switch, or similar signal. Such embodiments provide for a partial closing of the inner door as a means for providing a signal to a user that loading of the station should be completed. The partial closing provides visual feedback to a user and prevents further contents from being provided to an entry point or endpoint of the system to prevent clogging of the endpoint. However, in at least some embodiments, the inner door is not completely closed at least until the outer door is closed. In preferred embodiments, a partial closing of the inner door prevents further contents from being inserted into the endpoint but does not pose a risk of compressing or clamping a user's hand, arm, etc.

In some embodiments, systems of the present disclosure provide for visual and/or aural feedback mechanisms to indicate to a user that loading of a station should be completed. Such feedback mechanisms include, but are not limited to, lighting indicia and audio indicia. Applicant has found, however, that users may easily disregard input provided by such indicia, mechanisms, and devices. Accordingly, in at least some embodiments of the present disclosure, a partial closing of an inner door of a loading station is provided as a visual indicium to a user and as a physical barrier to providing additional contents to an endpoint of the station. Overloading of a station can result in clogging of the endpoint and/or junction with another conduit of the system. Accordingly, there is a need to prevent overloading of a loading station and to provide means to a user that loading operations should cease to avoid overloading or overburdening the system.

In some embodiments, the inner door closes to a preset distance that comprises a partial closing of the inner door. This partial closing is accomplished by a manual setting associated with a solenoid valve, a distance setting provided in a stepper motor, a physical stop provided within the door or door-frame, and/or a software setting or control. It is contemplated that the inner door remains at least partially open until a complete closing of the outer door has occurred. The complete closing of the outer door may be confirmed or signaled by a light-sensor, a contact point on a portion of the door that completes a circuit upon complete-closing, or similar means. In some embodiments, a signal associated with a complete closing of the outer door prompts the inner door to then open prior to complete closing of the inner door, allowing contents in the throat of the station to clear into the system before closing the inner door.

In certain embodiments, an inner door of a system is only operable when the outer door is completely closed. For example, in one embodiment, it is contemplated that the inner door is only operated when the outer door is closed and wherein complete closure of the outer door provides a signal that allows the inner door to be operated. A switch or control is provided external to the outer door to control (i.e. open and close) the inner door. The switch is only operable, however, when the outer door is completely closed, thereby completing a circuit or otherwise sending a signal to allow the switch or control to function. If the outer door is not completely closed, the control will not be operable to manipulate the inner door. In such embodiments, a control provided external to the outer door initiates a sequence for operating the inner door. For example, upon activating the control, a sequence is initiated wherein the inner door is opened for a predetermined time interval (e.g. 5 seconds) to allow for contents in between the doors to empty into the system, and the inner door is automatically closed upon completion of the time interval, assuming the outer door is still in the closed position at the completion of the time interval.

In certain embodiments, a plurality of controls is provided in communication with a loading station and wherein closing one or more doors of the system generally requires two-handed operation. For example, in one embodiment, it is contemplated that first and second controls are provided on opposing sides adjacent an outer door or load point. The first and second controls are spaced part and must be operated simultaneously in order to close at least one of the doors of the system. The two controls must be pressed, for example, to close at least the inner door, thereby effectively ensuring that a user's hand(s) is not provided within the loading station when the doors are closed.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of these inventions.

FIG. 2A is a top plan view of a loading station according to one embodiment of the present disclosure.

FIG. 2B is a front elevation view of the loading station according to the embodiment of FIG. 2A.

FIG. 2C is a right side elevation view of the loading station according to the embodiment of FIG. 2A.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Figure 1:
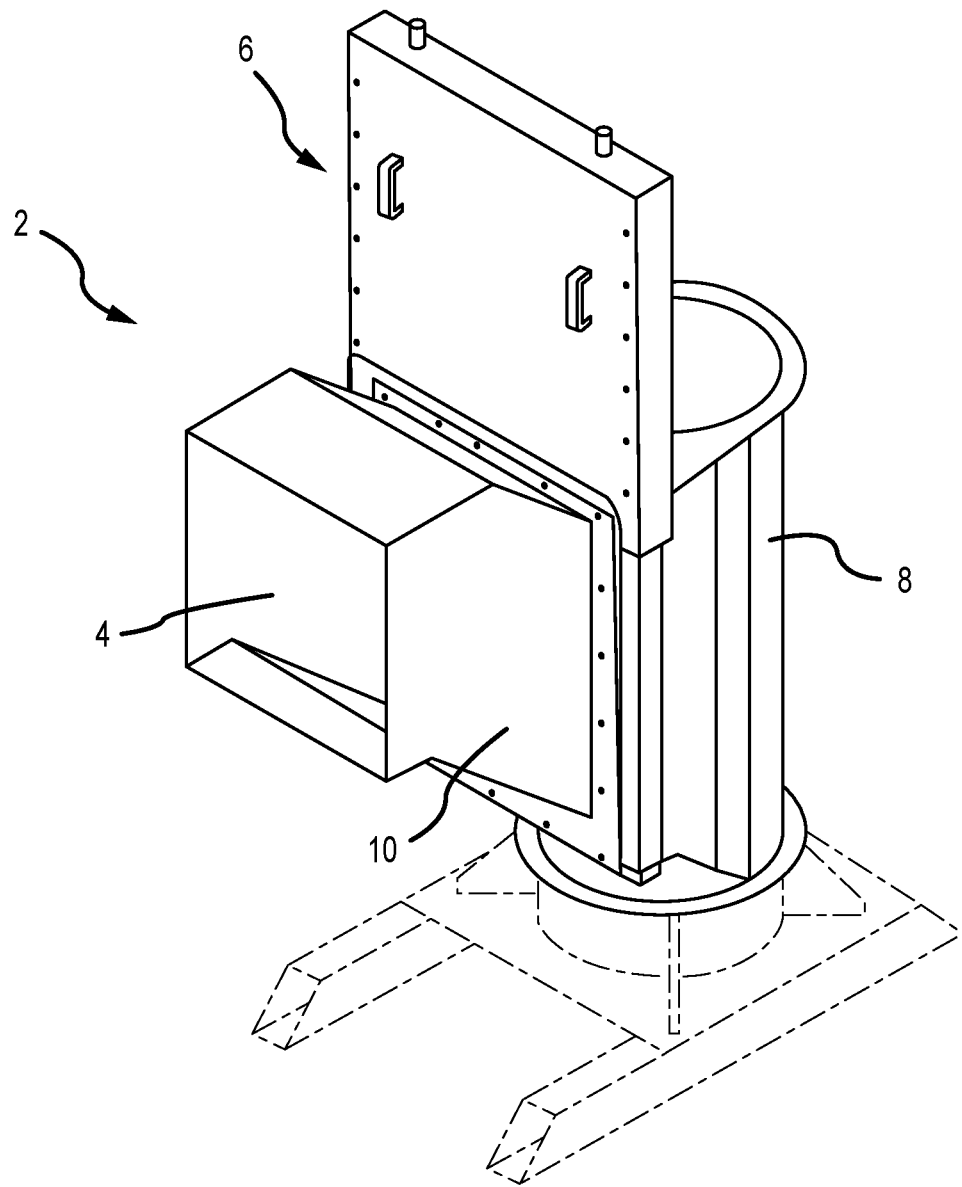
FIG. 1 is a front perspective view of a loading station according to one embodiment of the present disclosure.

FIG. 1 is a front perspective view of a loading station 2 operable for use with pneumatic tube transport systems according to one embodiment of the present disclosure. The station 2 of FIG. 1 is provided for illustrative purposes only, and it should be recognized that methods, features and systems of the present disclosure may be provided in combination with various different loading stations comprising one or more doors or access points. It will also be recognized that although various embodiments of the present disclosure are contemplated for use with pneumatic transfer systems, methods, systems and devices of the present disclosure are not limited to such systems. Indeed, various inventive aspects, methods, features, and devices of the present disclosure are contemplated for use with loading stations and entry points of various systems and structures, regardless of the intended use such systems and structures. Furthermore, in embodiments contemplated for use with pneumatic transfer systems, the present disclosure is not limited to any particular pneumatic transfer system. Embodiments disclosed herein are contemplated for use with pneumatic transfer systems operable to handle and convey linens, trash and recycling, carriers, medical waste, currency, food items, etc.

As shown in FIG. 1, a loading station 2 is provided. The loading station 2 comprises a primary entry point 4 that preferably comprises a first door (not shown in FIG. 1) and a second door 6. The first and second doors restrict access to a tube 8 for transporting materials. A throat 10 is provided between the first and second door. In various embodiments, it is contemplated that at least part of the station 2 is provided within a wall or similar structure, and a load provided is provided at or proximal to a finished face of a wall such that it is accessible by a user. In some embodiments, at least a portion of the throat 10, the second door 6, and the tube 8 are provided within a wall or similar structure. The entry point 4 is provided flush with a wall surface, or proximal thereto. Ingress to the throat is enabled and/or controlled by the first door, and ingress into the tube 8 and internal components of the system is enabled by and/or controlled by the second door 6.

FIGS. 2A-2C are top, front and side views of a loading station 2 according to one embodiment of the present disclosure. As shown, the station 2 comprises a first door 5 and a second door 6 that permit and prevent access to portions of the station 2 and associated system based on a position of the door(s). As shown in FIGS. 2A-2C, the first and second doors 5, 6 comprise sliding doors that are operable to slide in a vertical orientation, and wherein a raised position of the door(s) comprises an open position and a lowered position of the door(s) comprises a closed position. In preferred embodiments, the first door 5 is provided at or proximal to a wall surface of an interior wall of a structure (e.g. along the finished face of a hallway wall). The second door 6 and at least a portion of the throat 10 are preferably recessed within a wall such that they are not visible to building occupants (for example).

Figure 3:
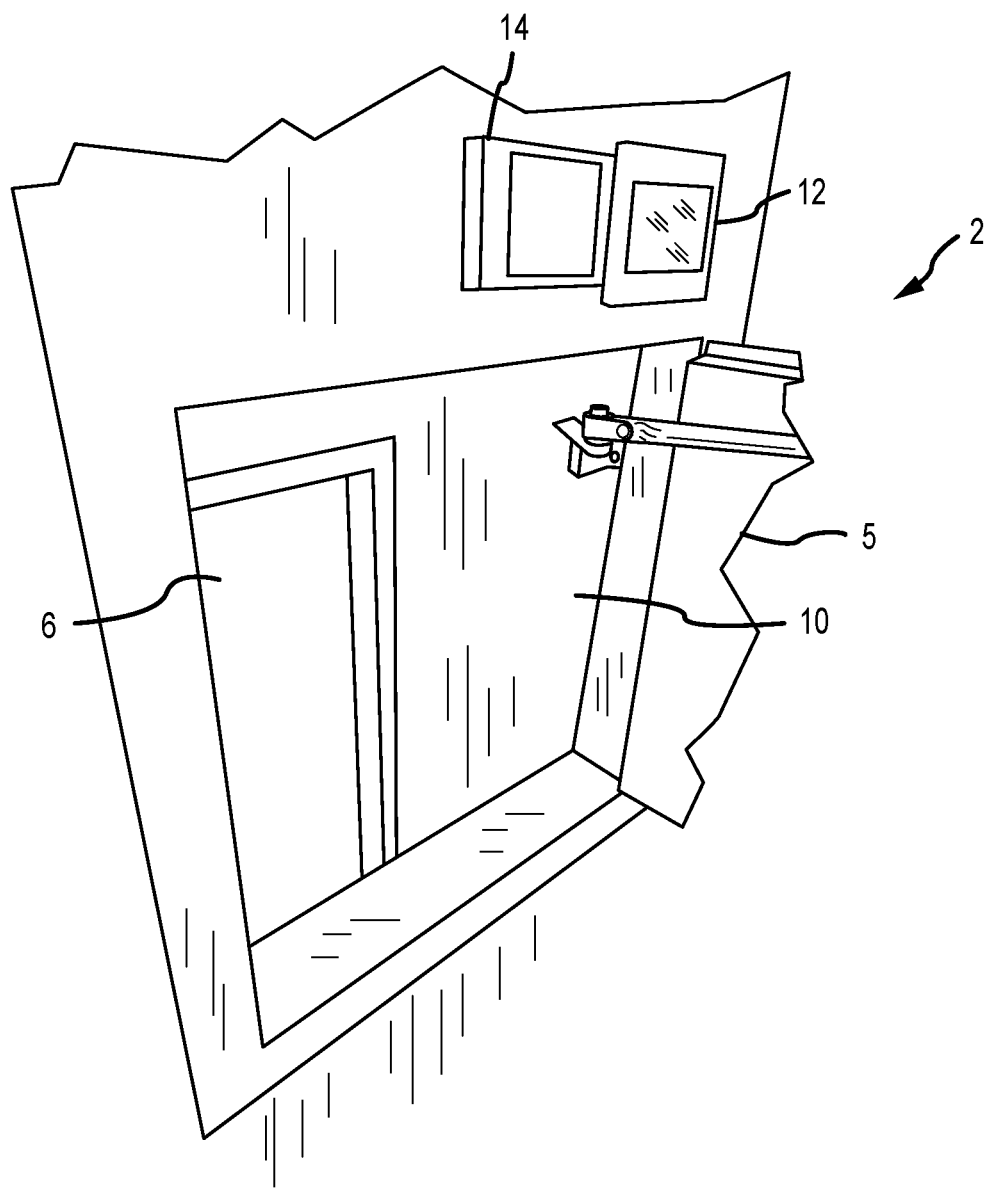
FIG. 3 is a perspective view of a loading station according to one embodiment of the present disclosure.

FIG. 3 is a perspective view of a loading station 2 according to one embodiment of the present disclosure. As shown, the station 2 comprises a first door 5 and a second door 6. A throat 10 is provided between the first door 5 and the second door 6. Collectively, the first door 5, the second door 6 and the throat 10 comprise an access or entry point for providing materials to a pneumatic transport system. The station 2 of FIG. 3 is contemplated as a load station for refuse, but it will be expressly recognized that stations and embodiments of the present disclosure are not limited to system designed to handle any particular material.

As shown in FIG. 3, systems of the present disclosure contemplate access, monitoring and control features. Specifically, a panel 12 is provided that is operable to receive and convey information to a user. For example, the panel 12 is contemplated as being operable to control vacuum suction to the load station 2, lock and unlock one or more doors, and receive various other inputs from a user. The panel 12 is also operable to provide information back to a user in the event that a clog or issue arises, for example. An access member 14 is also provided. The access member 14 is depicted as radio-frequency identification ("RFID") keycard pad for enabling access to one or more components of the loading station 2.

In various embodiments, methods of operating and using a loading station 2 are provided. In some embodiments, a method of operating a loading station 2 is provided wherein the system or loading station 2 is activated by a user. The activation step may be initiated by a user input on a panel 12 and/or an unlocking of the station by use of the access member 14. In various embodiments, "activation" of the loading station comprises at least one of: unlocking a first door 5, opening a second door 6, and/or initiating a vacuum source or flow of air in communication with the loading station. The method further comprises a step of opening the second door 6 of the station. The opening of the second door 6 of the station preferably comprises an automated function wherein a signal is provided to a motor (for example) in association with the second door 6 to automatically open the door without the need for direct user contact with the door. The second door 6 remains in an open position for a period of time. This period of time is contemplated as being a pre-programmed or set time interval (e.g. ten seconds). After the period of time has elapsed, a signal is provided to the second door 6 to perform a partial closing of the second door 6. In various embodiments, the partial closing of the second door 6 comprises a step of closing the second door such that materials are substantially prevented from entering the system through the second door 6. In various embodiments, the partial closing of the inner door 6 provides visual indicia to a user that loading of materials to the station 2 should cease. Furthermore, the partial closing of the second door 6 provides a safety feature wherein the door is not completely closed and objects and body parts cannot become compressed or trapped by the door (for example). In various embodiments, the method further comprises a step of closing the first door 5. The closing of the first door 5 provides a signal to the system that a complete closing of the second door 6 should occur. In preferred embodiments, the complete closing of the second door 6 comprises moving the second door 6 from a partially closed position to a fully open position, allowing any materials provided in the throat to pass through the second door 6 and into the system, and subsequently closing the second door 6. In this manner, the second door 6 is completely closed and/or sealed only after a complete closing of the first door 5 has occurred.

Figure 4:
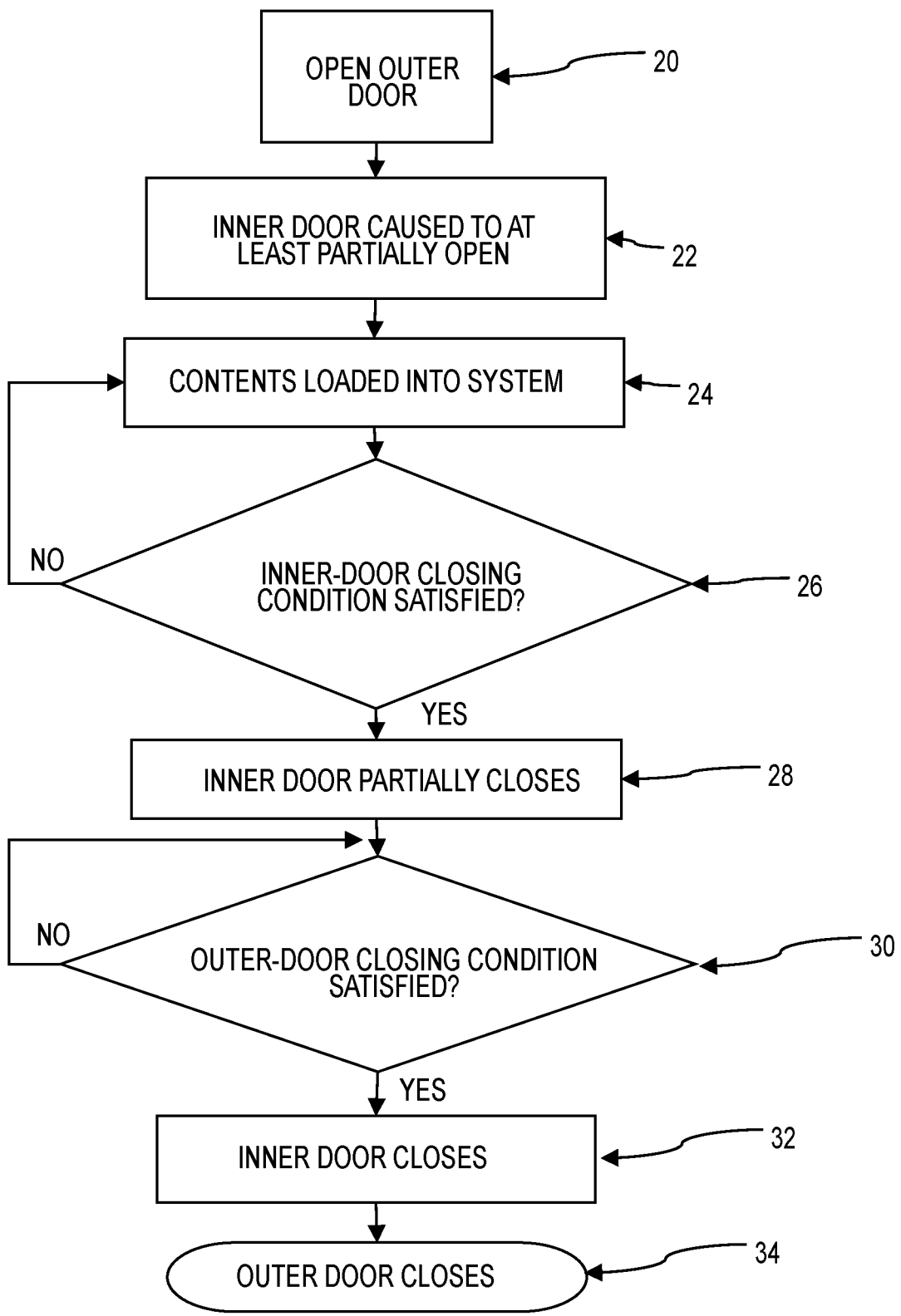
FIG. 4 is a flow chart depicting a method of operating a loading station according to one embodiment of the present disclosure.

FIG. 4 is a flow chart depicting a method of operating a loading station 2 according to one embodiment of the present disclosure. As shown, the method comprises various process steps. The method is contemplated as comprising an initiating step 20 wherein an outer door of a loading station is opening. Loading stations and loading-station structure contemplated for use with the method of FIG. 4 include but are not limited to the devices and features shown in FIGS. 1-3. Once the outer door is opened in step 20, the inner door is caused to at least partially open as provided in step 22. In some embodiments, the inner door is caused to open wherein a system associated with the station provides a signal to the inner door to open via a servo-motor for example. The opening of the outer door in step 20 preferably initiates this signal. In some embodiments, the step of opening the outer door results in a signal being provided to unlock the inner door, and the inner door is opened subsequent to the unlocking step. With both doors open, contents (e.g. trash, linen, etc.) are loaded into the station at step 24. Both doors preferably remain open during loading until an inner-door closing condition is satisfied at step 26. Step 26 comprises a decision block wherein the doors remain open and a loop is initiated. Upon the occurrence of the condition in step 26 being satisfied, the loop terminates as is described in more detail herein.

The inner-door closing condition of step 26 is contemplated as comprising various different conditions. For example, in one embodiment, the closing condition of step 26 is contemplated as comprising a duration wherein the condition is satisfied upon the expiration of a predetermined amount of time measured by a timer. Upon the timer determining that the predetermined time (e.g. one minute) has elapsed, the condition is deemed satisfied and the process proceeds to step 28 wherein the inner door is partially closed. If the condition is not satisfied (i.e. the predetermined time has not elapsed), the doors remain open and loading the station continues to be enabled. The predetermined time may be adjusted and programmed based on various system parameters. An advantage of systems and methods of the present disclosure comprises a reduced risk of clogging an endpoint. Accordingly, the predetermined time may be set or established based on a size of the endpoint, understanding that a larger endpoint will require more time to overload.

In another embodiment, the closing condition of step 26 is contemplated as comprising one or more fill-level sensors. For example, one or more sensors (e.g. light-sensors, load-cells, etc.) are contemplated as being provided within systems of the present disclosure. If and when such sensor(s) detects the presence of materials beyond a certain allowable fill-level in the endpoint (for example), the sensor is operable to provide a signal to the system to indicate that the inner-door closing condition of step 26 has been satisfied.

The partial closing of the inner door as shown in step 28 of FIG. 4 is provided as a visual and physical indicium to a user that loading of the throat should be terminated. Preferably, the inner door closes to an extent that contents are not able to enter the system, but the door is not completely closed to prevent a user's hand (for example) from becoming compressed or otherwise caught in the inner door. In various embodiments, the inner door closing of step 28 comprises a step wherein the inner door is closed to a point where at least a one-inch gap is provided between the inner door and surrounding structure. In some embodiments, the gap is provided between one inch and five inches. The gap may vary based on contents that are expected to be loaded into the system (for example). With the inner door at least partially closed, the system proceeds to step 30. Step 30 generally comprises a safety feature wherein the system continuously checks for an outer-door closing condition. If the outer-door closing condition has not been satisfied, the outer door remains open and the loop continues. If the outer-door closing condition has been satisfied, the system proceeds to close the inner and outer doors as shown in step 32 and 34. The closing of the outer door in step 34 represents the end of the operation or method.

In various embodiments, the outer-door closing condition of step 30 comprises at least one of a sensor and a timer. In some embodiments, the system comprises a timer and wherein a predetermined amount of time must elapse between the partial closing of the inner door in step 28 and the closing of the outer door. In some embodiments, a sensor is provided in addition to or in lieu of the timer. The sensor may comprise, for example, a light sensor or similar sensor that is operable to determine whether a user's hand or arm is provided in the outer door. If the sensor detects the presence of such an object or body part within the outer door area, the loop of step 30 continues. In further embodiments, it is contemplated that the outer-door closing condition of step 30 comprises a manual input. Specifically, it is contemplated that to close the outer door, a user must operate two inputs (e.g. buttons) on opposing sides of the outer door thereby making it difficult or impossible to close the outer door on one's own hand. FIG. 4 depicts a method of the present disclosure according to one embodiment. The method of FIG. 4 reduces safety risks to users of a loading station system, and further reduces the likelihood that a user will over-fill or overwhelm the load point (e.g. a box collector) of a pneumatic transfer system.

Figure 5:
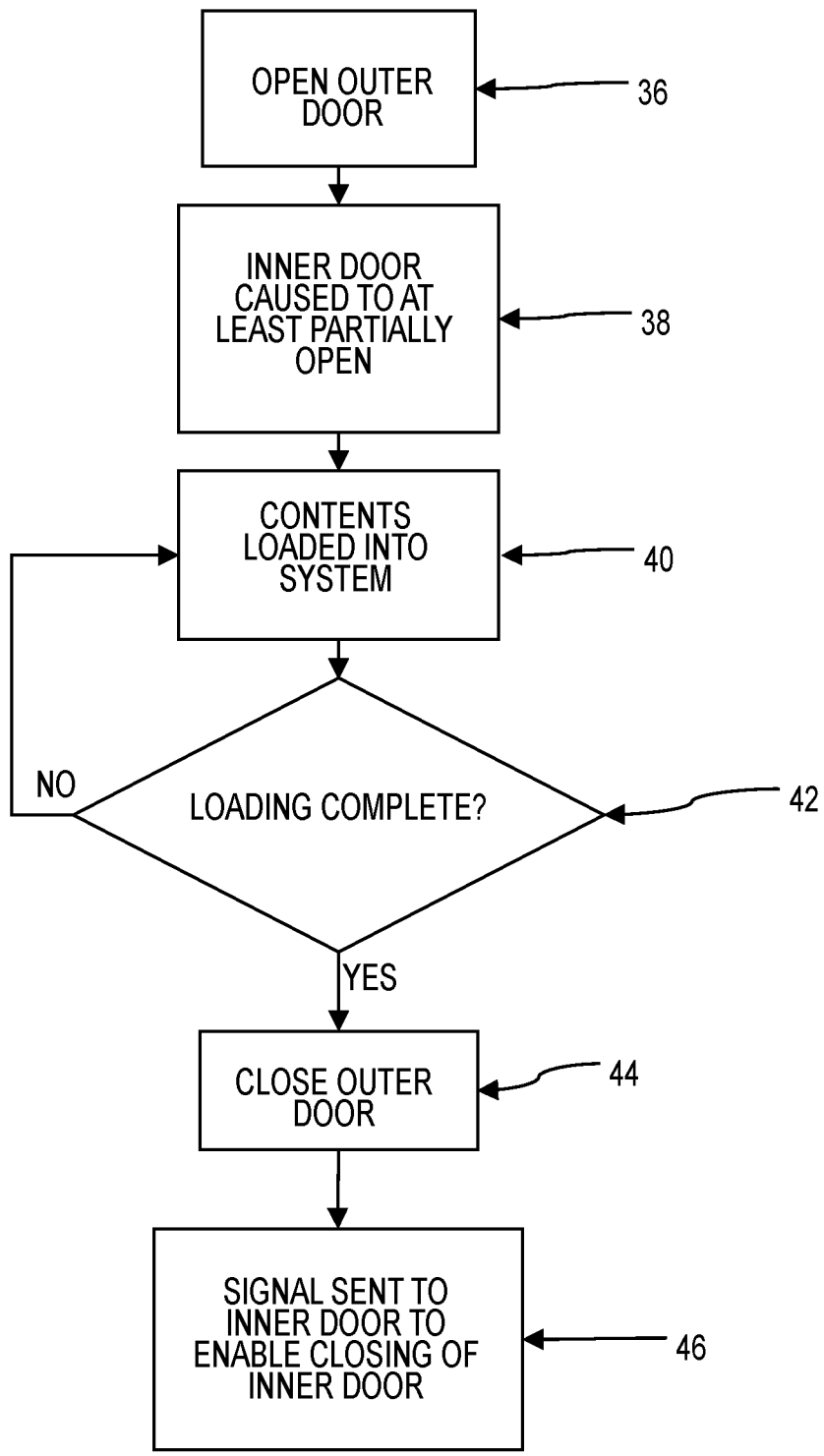
FIG. 5 is a flow chart depicting a method of operating a loading station according to one embodiment of the present disclosure.

FIG. 5 is a flowchart of another embodiment of the present disclosure comprising a method of operating a loading station. As shown in FIG. 5, a method of operating a loading station is provided comprising a first step of opening an outer door in step 36. Subsequently, the inner door is caused to at least partially open in step 38. The inner door may be opened manually or may be triggered to open by a signal created by the opening of the outer door. Contents are then loaded into the system at step 40. Contents are generally loaded into the throat of a loading station such as that shown in FIG. 1, for example. Contents may thereafter be provided to an endpoint of a box collector or other internal component of a pneumatic transfer system. However, as will be recognized by one of ordinary skill in the art, it is possible to overload such systems and clog the endpoint, the throat, or the pipe (for example). When loading is complete as shown in step 42, the method proceeds to close the outer door at step 44.

The determination of whether loading is complete as shown in step 42 may be accomplished in various ways. For example, the system may comprise a timer that is activated upon opening of the outer door in step 36. The timer is operable to determine that a predetermined amount of time has elapsed since the opening of the outer door (e.g. one minute) and thereafter provide feedback to user that the loading should terminate. The feedback is contemplated as comprising at least one of an aural and a visual indicium that instructs a user to close the outer door (step 44). Upon complete closing of the outer door, a signal is sent (step 46) to enable closing of the inner door. In various embodiments, a complete closing of the outer door completes a circuit or otherwise sends an electrical system that enables closing and/or closes the inner door. This method physically requires that the outer door is completely closed prior to allowing or enabling the inner door to perform a closing operation.

Figure 6:
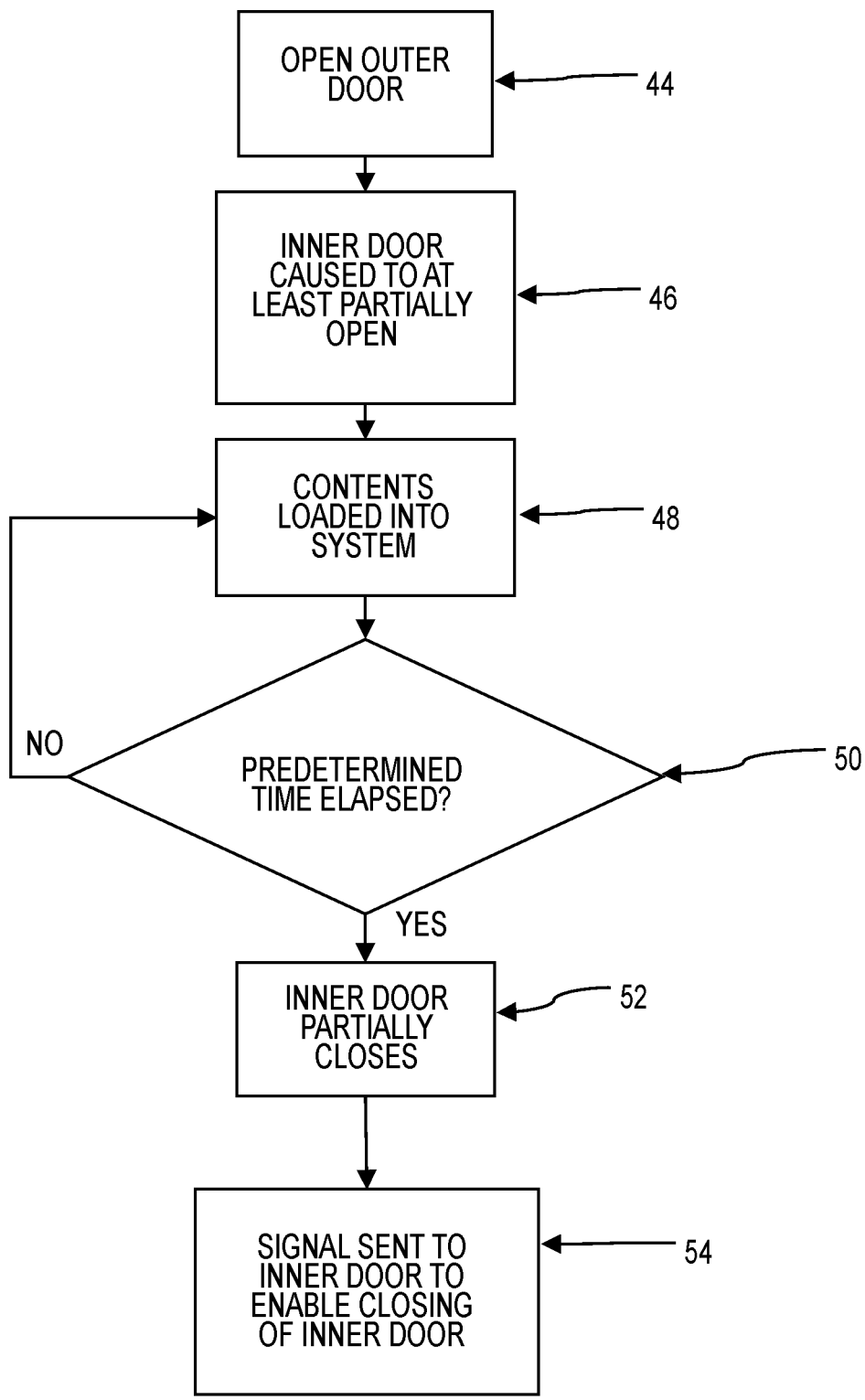
FIG. 6 is a flow chart depicting a method of operating a loading station according to one embodiment of the present disclosure.

FIG. 6 is a flowchart of another embodiment of the present disclosure comprising a method of operating a loading station. As shown in FIG. 6, a method of operating a loading station is provided comprising a first step of opening an outer door in step 44. As shown in FIG. 6, a method of operating a loading station is provided comprising a first step of opening an outer door in step 44. Subsequently, the inner door is caused to at least partially open in step 46. The inner door may be opened manually or may be triggered to open by a signal created by the opening of the outer door. Contents are then loaded into the system at step 48. Contents are generally loaded into the throat of a loading station such as that shown in FIG. 1, for example. Contents may thereafter be provided to an endpoint of a box collector or other internal component of a pneumatic transfer system. However, as will be recognized by one of ordinary skill in the art, it is possible to overload such systems and clog the endpoint (for example). Accordingly, after a predetermined amount of time has elapsed (step 50), the inner door is caused to partially close (step 52). The partial and preferably near-complete closing of the inner door signals to a user that loading should be completed, but without the risk of injuring a user. Partial closing of the inner door is followed by a signal that is operable to accomplish complete closing of the inner door. In some embodiments, it is contemplated that the system comprises a controller. The controller is connected to a timer, and the controller is operable to close the inner door completely after a predetermined amount of time has elapsed after partial closing of the inner door.

Figure 7:
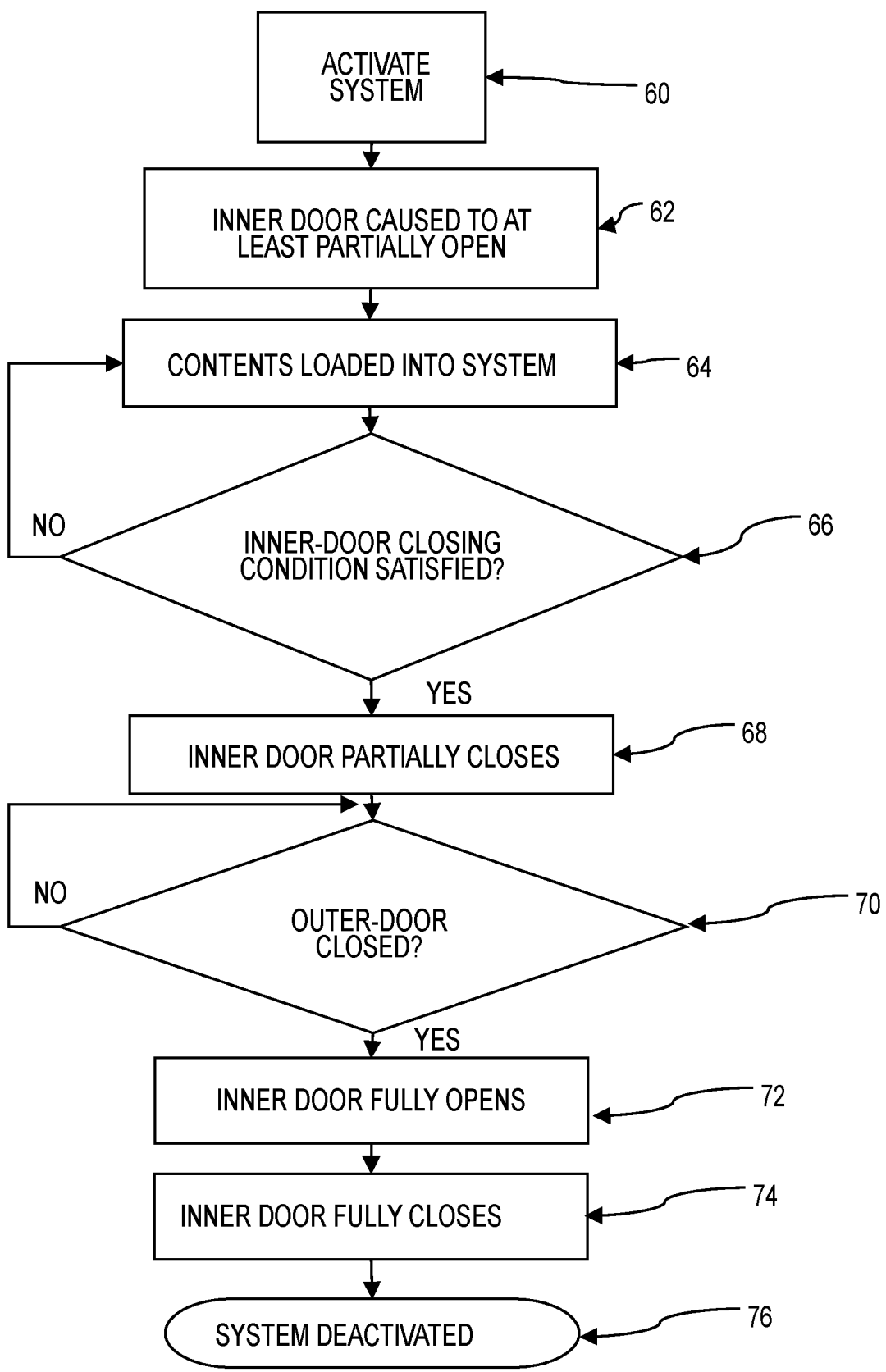
FIG. 7 is a flow chart depicting a method of operating a loading station according to one embodiment of the present disclosure.

FIG. 7 is a flowchart depicting a method according to yet another embodiment of the present disclosure. As shown, the method comprises a step of activating a system 60. The activation step may comprise, for example, opening or unlocking a door of a loading station and/or providing a user input to activate a loading sequence. Subsequent to activation of the system in step 60, an inner door of the system is caused to open at step 62. With the inner door open, a user loads materials into a loading station at step 64. In order to prevent clogging and/or overloading of a loading station, the method comprises a condition at step 66 to determine whether or not an inner-door closing condition has been satisfied. In some embodiments, the inner door closing condition of step 66 comprises a timer wherein the method proceeds to step 68 after a predetermined amount of time (e.g. 10-30 seconds). When the condition is satisfied, the method and system proceeds to step 68 wherein an inner door of the system partially closes. In preferred embodiments, the partial closing of the inner door of step 68 comprises the inner door closing to between about 80 percent and about 90 percent of complete closure. The partial closing of the inner door illustrated in step 68 provides a physical barrier to further ingress of materials and also provides a visual indicium to a user that loading operations should be completed. The method then proceeds to step 70 wherein the first or outer door of the loading station must be closed. When the outer door is closed, the method and system provides a signal to complete closing of the inner door. In the depicted embodiment, the complete closing of the inner door is provided in a two-step process wherein the inner door is fully opened in step 72 and then fully closed in step 74. This opening and complete closing of the inner door subsequent to closing of the outer door allows the system to clear any contents or materials that remain in the throat the loading station. After step 74, wherein both inner and outer doors of the system are now closed, the loading station is deactivated. In some embodiments, it is contemplated that the system does not allow for a loading station to be re-activated for a predetermined amount of time after the methods provided herein are conducted. This predetermined amount of time allows the system to completely clear before user(s) may provide additional materials to the system.

While various embodiments of the disclosed device have been described in detail, it is apparent that modifications and alterations of those embodiments will occur to those skilled in the art. However, it is to be expressly understood that such modifications and alterations are within the scope and spirit of the present disclosure, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The foregoing discussion has been presented for purposes of illustration and description. The foregoing is not intended to limit the disclosure to the form or forms disclosed herein. In the foregoing description for example, various features of the disclosure have been identified. It should be appreciated that these features may be combined together into a single embodiment or in various other combinations as appropriate. The dimensions of the component pieces may also vary, yet still be within the scope of the disclosure. Moreover, though the description has included description of one or more embodiments and certain variations and modifications, other variations and modifications are within the scope of the disclosure, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present disclosure, in various embodiments, includes components, methods, processes, systems and/or apparatus substantially as depicted and described herein, including various embodiments, subcombinations, and subsets thereof. Those of skill in the art will understand how to make and use the devices of the disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A method of operating a loading station of a pneumatic transfer system, the method comprising:
opening a first door of a loading station, wherein the first door comprises an access point for materials to enter the pneumatic transfer system;
opening a second door of the loading station, wherein the second door is spaced apart from the first door and wherein a throat area is provided and defined at least partially by the first door and the second door;
allowing materials to be provided into the throat area;
monitoring with a controller for a predetermined amount of time to elapse and based on the predetermined amount of time elapsing, partially closing the second door and providing a gap between the second door and the system to provide a visual indicium to a user that loading operations should be completed;
monitoring with the controller for the first door to be closed and based on the controller receiving a signal that the first door is closed, reopening the second door, maintaining the first door in the closed position, allowing materials in the throat area to clear, and subsequently fully closing the second door by providing a signal from the controller to enable closing of the second door.

2. The method of claim 1, wherein the second door comprises an inner door to control access between the throat area and internal components of the pneumatic transfer system.

3. The method of claim 1, further comprising sending and receiving a signal that a path of travel of the second door is unobstructed prior to fully closing the second door.

4. The method of claim 3, wherein the signal is based upon an input from a light sensor.

5. The method of claim 1, wherein the step of partially closing the second door provides a gap of between approximately 1.0 and 5.0 inches to prevent contents from being inserted into the system and does not pose a risk of injuring a user.

6. A method of operating a loading station of a pneumatic transfer system, the method comprising:
activating a loading station;
opening a first door of the loading station, wherein the first door comprises an access point for materials to enter the pneumatic transfer system;

wherein at least one of the activating the loading station and opening the first door causes a controller to provide a signal to open a second door of the loading station, wherein the second door is spaced apart from the first door by not more than approximately 36 inches and wherein a throat area is provided between the first door and the second door;

maintaining the first door and the second door in an open position for a predetermined amount of time;

monitoring with the controller for the predetermined amount of time to elapse after the opening of the second door, and partially closing the second door to provide a gap between the second door and the system to provide a visual indicium to a user that loading operations should be completed;

based on the controller determining that first door has been closed, reopening the second door, allowing materials to clear the throat area, and subsequently fully closing the second door.

7. The method of claim 6, wherein the predetermined amount of time comprises at least three seconds.

8. The method of claim 6, wherein the second door comprises an inner door to control access between the throat area and internal components of the pneumatic transfer system.

9. The method of claim 6, wherein an audio signal is provided to indicate the closing of the second door.

10. The method of claim 6, wherein activating the load station comprises unlocking the first door.

11. The method of claim 6, wherein activating the load station comprises manually opening the first door.

12. The method of claim 6, wherein the step of partially closing the second door provides a gap of between approximately 1.0 and 5.0 inches to prevent contents from being inserted into the system and does not pose a risk of injuring a user.

13. A method for use in a computerized controller for operating a pneumatic transfer system comprising the steps of:

activating a loading station of the pneumatic transfer system, wherein the loading station comprises a first door that comprises an access point for a user to load materials into the pneumatic transfer system, and a second door, wherein the second door is spaced apart from the first door and wherein a throat area is provided between the first door and the second door;

based on a controller identifying that the first door is provided in an open position, providing a signal to open the second door;

maintaining the first door and the second door in an open position for at least a first predetermined amount of time;

monitoring with the controller for the first predetermined amount of time to elapse and upon expiration of the first predetermined amount of time, partially closing the second door to provide a gap between the second door and the system;

based on the controller determining that first door has been closed, reopening the second door, allowing materials to clear the throat area, and subsequently fully closing the second door; and preventing the loading station from being re-activated for a second predetermined amount of time after the closing of the second door.

14. The method of claim 13, wherein the first predetermined amount of time comprises at least three seconds.

15. The method of claim 13, wherein the second door comprises an inner door to control access between the throat area and internal components of the pneumatic transfer system.

16. The method of claim 13, wherein the step of activating the load station comprises an unlocking of the first door.

17. The method of claim 13, wherein the step of activating the load station comprises scanning a user's credentials.

18. The method of claim 13, wherein the step of partially closing the second door provides a gap of between approximately 1.0 and 5.0 inches to prevent contents from being inserted into the system and does not pose a risk of injuring a user.

* * * * *